United States Patent
Lapra et al.

(10) Patent No.: US 9,487,049 B2
(45) Date of Patent: *Nov. 8, 2016

(54) RUBBER COMPOSITION FOR MAGNESIUM HYDROXIDE WAFER-REINFORCED TIRE

(75) Inventors: Arnaud Lapra, Saint-Saturnin (FR); Franck Varagniat, Ceyrat (FR); Anne Veyland, Marsat (FR)

(73) Assignee: MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1575 days.

This patent is subject to a terminal disclaimer.

(21) Appl. No.: 11/988,217

(22) PCT Filed: Jul. 4, 2006

(86) PCT No.: PCT/EP2006/006492
§ 371 (c)(1),
(2), (4) Date: May 14, 2009

(87) PCT Pub. No.: WO2007/003408
PCT Pub. Date: Jan. 11, 2007

(65) Prior Publication Data
US 2009/0297827 A1 Dec. 3, 2009

(30) Foreign Application Priority Data

Jul. 6, 2005 (FR) ...................................... 05 07226

(51) Int. Cl.
*B60C 1/00* (2006.01)
*C08K 3/22* (2006.01)
(Continued)

(52) U.S. Cl.
CPC ............... *B60C 1/0016* (2013.04); *C08K 3/22* (2013.01); *C08K 9/02* (2013.01); *C08K 5/548* (2013.01); *C08K 7/00* (2013.01); *Y10T 428/25* (2015.01); *Y10T 428/266* (2015.01)

(58) Field of Classification Search
USPC .......... 428/331; 524/456, 499, 856; 525/369
See application file for complete search history.

(56) References Cited

U.S. PATENT DOCUMENTS 4,963,610 A * 10/1990 Schmid et al. ............... 524/436
5,143,965 A *  9/1992 Mertz ........................... 524/436
(Continued)

FOREIGN PATENT DOCUMENTS

EP      1219676 A1     7/2002
EP      1500679 A1     1/2005
(Continued)

OTHER PUBLICATIONS

Machine translation of JP 05-132585 A.*

*Primary Examiner* — Mike M Dollinger
(74) *Attorney, Agent, or Firm* — Dickinson Wright PLLC

(57) ABSTRACT

The invention relates to a rubber composition having improved vulcanization kinetics, which can be used in particular for manufacturing tires or semi-finished products for tires, based on at least one diene elastomer, a reinforcing filler and a coupling agent providing the bond between filler and elastomer, characterized in that said reinforcing filler comprises synthetic magnesium hydroxide $Mg(OH)_2$ wafers, covered with silica. The invention also relates to the use of such a composition for manufacturing rubber articles, in particular tires or semi-finished products made of rubber intended for these tires, especially treads. The invention also relates, per se, to this synthetic magnesium hydroxide in the form of silica-covered wafers, and also to its use as a reinforcing filler, especially in a diene elastomer matrix.

29 Claims, 1 Drawing Sheet

(51) Int. Cl.
  *C08K 9/02* (2006.01)
  *C08K 5/548* (2006.01)
  *C08K 7/00* (2006.01)

(56) References Cited

U.S. PATENT DOCUMENTS

| | | | | |
|---|---|---|---|---|
| 5,759,509 | A * | 6/1998 | Miyata et al. | 423/594.2 |
| 6,254,847 | B1 * | 7/2001 | Kurisu et al. | 423/594.4 |
| 7,060,246 | B2 * | 6/2006 | Oishi et al. | 423/635 |
| 7,718,717 | B2 * | 5/2010 | Lapra et al. | 523/216 |
| 8,980,983 | B2 * | 3/2015 | La Rosa et al. | 524/424 |
| 2002/0132904 | A1 * | 9/2002 | Langstein et al. | 524/495 |
| 2002/0156169 | A1 | 10/2002 | Kondo et al. | |
| 2002/0169245 | A1 | 11/2002 | Ohta et al. | |
| 2003/0235693 | A1 * | 12/2003 | Oishi | C01F 5/14 |
| | | | | 428/422.8 |
| 2005/0038166 | A1 | 2/2005 | Fukuchi et al. | |
| 2005/0182159 | A1 | 8/2005 | Udagawa et al. | |
| 2006/0128865 | A1 * | 6/2006 | Kodama et al. | 524/436 |
| 2008/0054221 | A1 * | 3/2008 | Maddan | 252/182.33 |
| 2010/0069555 | A1 * | 3/2010 | Yamashita | 524/436 |
| 2010/0160512 | A1 * | 6/2010 | Tsukamoto et al. | 524/195 |

FOREIGN PATENT DOCUMENTS

| | | |
|---|---|---|
| EP | 1593652 A1 | 11/2005 |
| JP | 05132585 A * | 5/1993 |
| WO | WO 2004/065300 A1 | 8/2004 |
| WO | WO 2004065300 A1 * | 8/2004 |

* cited by examiner

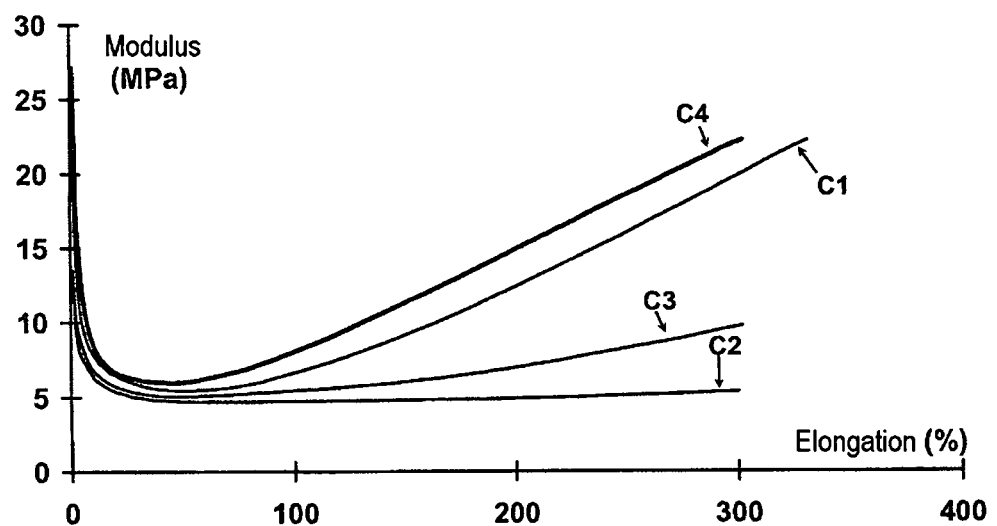

RUBBER COMPOSITION FOR MAGNESIUM HYDROXIDE WAFER-REINFORCED TIRE

The present invention relates to diene rubber compositions that can be used for manufacturing tyres or semi-finished products for tyres, in particular treads of these tyres, and also to the inorganic reinforcing fillers capable of reinforcing such rubber compositions.

In order to reduce fuel consumption and the pollution emitted by motor vehicles, considerable effort has been spent by tyre designers to obtain tyres having at the same time a very low rolling resistance, an improved grip both on dry ground and on wet or snowy ground, and also good wear resistance.

Numerous solutions have especially been proposed in the past to lower the rolling resistance and improve the grip of tyres, but these generally result in a very large deterioration of the wear resistance.

It is well known, in particular, that the incorporation of conventional white fillers such as for example conventional silicas or aluminas, chalk, talc, natural aluminosilicates such as bentonite or kaolin, in rubber compositions used for manufacturing tyres and especially treads, most certainly results in a lowering of the rolling resistance and in an improvement of the grip to wet, snowy or icy ground, but also in an unacceptable deterioration of the wear resistance linked to the fact that these conventional white fillers do not have a sufficient reinforcement capability with respect to such rubber compositions. These white fillers are generally qualified, for this reason, as non-reinforcing fillers also called inert fillers.

An effective solution to this problem of insufficient wear resistance has been found thanks to the recent development, over the course of the last 10 years, of novel rubber compositions comprising truly reinforcing inorganic fillers, in particular highly dispersible silicas (known as "HSD"), which have proved capable of replacing conventional carbon blacks for tyres.

Compositions based on HDS silica however have the known drawback of having vulcanisation kinetics that are substantially slowed down, as a general rule by a factor of two to three, relative to the conventional compositions filled with carbon black. The longer curing times which result therefrom are known to penalize the industrial processing of tyres or tyre treads based on such compositions.

However, the Applicants have discovered during their research that there is a specific metallic hydroxide, of the synthetic type, which may also be used in the rubber compositions as a true reinforcing filler, that is to say capable of replacing a carbon black or an HDS silica. Unexpectedly, this specific hydroxide offers not only an excellent reinforcement capability to the rubber compositions containing them, due to a high dispersibility, close to those available with HDS-type silicas, but also very greatly improved vulcanisation kinetics in comparison to the use of such silicas.

Consequently, a first subject of the invention relates to a rubber composition based on at least one diene elastomer, a reinforcing filler and a coupling agent, characterized in that said reinforcing filler comprises synthetic magnesium hydroxide wafers, covered with silica.

This magnesium hydroxide is composed of aggregates (or secondary particles) having an anisometric wafer shape, which may give the compositions of the invention an anisotropy of properties which is advantageous for certain applications.

Another subject of the invention is these synthetic magnesium hydroxide wafers, covered with silica, in themselves.

Another subject of the invention is the use, as a reinforcing filler, especially in a rubber composition, of the hybrid- or composite-type filler above, hereinbelow also denoted by "reinforcing magnesium hydroxide", being in the form of synthetic magnesium hydroxide wafers covered with silica.

Another subject of the invention is a process for obtaining a rubber composition having improved vulcanisation kinetics, into which at least one diene elastomer, at least one reinforcing filler and a coupling agent are incorporated, said coupling agent providing the bond between the filler and the elastomer, this process being characterized in that said filler comprises a reinforcing magnesium hydroxide, and in that the entire mixture is kneaded thermomechanically, in one or more steps, until a maximum temperature between 110° C. and 190° C. is attained.

Another subject of the invention is the use of a composition according to the invention for manufacturing finished articles or semi-finished products made of rubber, and also these finished articles and semi-finished products themselves, comprising a rubber composition according to the invention, these articles or products being intended for any ground-contact system for motor vehicles, such as tyres, internal safety supports for tyres, wheels, rubber springs, elastomeric joints, other suspension and anti-vibratory elements.

A most particular subject of the invention is the use of a rubber composition according to the invention for manufacturing tyres or semi-finished products made of rubber intended for these tyres, these semi-finished products being especially chosen from the group composed of treads, underlayers intended, for example, to be placed under these treads, crown plies, sidewalls, carcass plies, beads, protectors, inner tubes and airtight innerliners for tubeless tyres.

The composition according to the invention is particularly suitable for manufacturing tyre treads intended to equip passenger vehicles, vans, 4×4 vehicles (having four-wheel drive), two-wheel vehicles, "heavy goods vehicles" (that is to say metro vehicles, buses, heavy road transport vehicles (lorries, tractors, trailers), off-road vehicles), aeroplanes, and civil engineering, land or handling vehicles, these treads possibly being used during the manufacture of new tyres or for retreading used tyres.

Reduced curing times are especially advantageous for treads intended for retreading, whether this involves "cold" retreading (use of a pre-cured tread) or conventional "hot" retreading (use of a tread in the uncured state). In the latter case, a reduced curing time, besides the fact that it reduces production costs, limits the over-curing (or post-curing) imposed on the rest of the casing (carcass) of the used (already vulcanised) tyre.

The invention and also its advantages will be clearly understood in light of the description and exemplary embodiments which follow, and also the single appended FIGURE which reproduces curves of the variation of modulus as a function of elongation for various rubber compositions, conforming and not conforming to the invention.

I. MEASUREMENTS AND TESTS USED

I-1. Characterization of the Reinforcing Fillers

The fillers described below consist of agglomerates of particles, capable of being broken up into these particles under the effect of an external force, for example under the action of mechanical work or ultrasounds. The term "particle" used in the present application must be understood in its usual generic meaning of aggregate (also called "secondary particle"), and not in that of elementary particle (also called "primary particle") which may form, where appropriate, part of this aggregate; the term "aggregate" should be understood in a known manner to be the undividable assembly (i.e. which cannot be cut, split or divided) which is produced during the synthesis of the filler, in general formed from elementary (primary) particles aggregated together.

These fillers are characterized as indicated below.

a) BET Specific Surface Area:

The BET specific surface area is determined by gas adsorption using the Brunauer-Emmett-Teller method described in "The Journal of the American Chemical Society" Vol. 60, page 309, February 1938), more specifically according to the French Standard NF ISO 9277 from December 1996 [multipoint (5 points) volumetric method—gas: nitrogen—degassing: 1 hour at 160° C.—range of relative pressure $p/p_o$: 0.05 to 0.17].

b) Average Particle Size $d_w$:

The (weight) average size of the particles, denoted by $d_w$, is measured in a known manner after ultrasound dispersion of the filler to be analysed.

Measurement is carried out using an optical detection centrifuge sedimentometer of the type "DCP" (Disc Centrifuge Photosedimentometer), sold by Brookhaven Instruments, used in particular in a known manner for the characterization of carbon black particles. The machine is equipped with an LED source emitting in the spectral band between 600 and 700 nm.

The procedure is the following. A suspension is produced of 200 mg of filler sample to be analysed, in 40 ml of aqueous solution containing 12 g/l of sodium hexametaphosphate as a suspension stabiliser, via the action, lasting 8 min, at 60% power (60% of the maximum "output control" position) of a 1500 W ultrasound probe (¾ inch Vibracell sonicator sold by Bioblock under the reference M75450). To limit overheating during sonication, the suspension is preferably placed in a bath of cold water (for example at a temperature of 5 to 10° C.). After sonication, 15 ml of the suspension is introduced in the rotating disc. After sedimentation over 120 min, the weight-distribution of the particle sizes is calculated by the "DCP" sedimentometer software; the weight-average of the particle sizes, denoted by $d_w$, is calculated by the software using the following equation (with $n_i$ being the number of objects in the grade of diameter $d_i$):

$$d_w = \frac{\sum_{i=1}^{n} n_i d_i^4}{\sum_{i=1}^{n} n_i d_i^3}$$

The calculation carried out by the software uses a specific optical correction that takes into account the complex refractive index of the Mg hydroxide (n*=1.574+0.1i), the refractive index of the suspension medium and the spectral characteristics of the source/detector pair supplied by Brookhaven Instruments. The refractive index of the suspension medium as a function of the wavelength of the LED source is obtained in a known manner by linear interpolation between the refractive indices values of water at 20° C.: 1.3322 at 620 nm and 1.3305 at 690 nm. This optical correction is generated using the DCP_SCAT.exe program from Brookhaven Instruments.

c) Deagglomeration Rate α:

The deagglomeration rate (denoted as α) is measured in the test known as the "ultrasound deagglomeration test", at 100% power of a 600 W (watt) probe operating here in pulsed mode (namely, 1 second ON, 1 second OFF) in order to prevent excessive overheating of the ultrasound probe during the measurement. This known test, which is especially the subject of Patent Application WO 99/28376 (see also WO 99/28380, WO 00/73372 and WO 00/73373), makes it possible to continuously measure the change of the average (by volume) size of the agglomerates of particles during a sonication, according to the indications below.

The assembly used is composed of a laser particle size analyser (type "Mastersizer S" sold by Malvern Instruments—He—Ne laser source emitting in the red, wavelength 632.8 nm) and its preparation unit ("Malvern Small Sample Unit MSX1"), inserted between which is a continuous flow treatment cell (Bioblock M72410) equipped with an ultrasound probe (½ inch Vibracell type 600 W sonicator sold by Bioblock).

A small quantity, generally between 20 and 200 mg of filler to be analysed (for example 150 mg) is introduced into the preparation unit with 160 ml of water, the circulation rate being set to its maximum. At least three consecutive measurements are carried out to determine, according to the known calculation method of Fraunhofer (Malvern 3$$D calculation matrix), the initial average (by volume) diameter of the agglomerates, denoted by $d_v[0]$. The sonication (pulsed mode: 1 s ON, 1 s OFF) is then set at 100% power (namely 100% of the maximum position of the "tip amplitude") and the change of the volume-average diameter $d_v[t]$ is monitored over about 8 min as a function of the time "t" with one measurement being taken around every 10 seconds. After an induction period (around 3-4 min) it is observed that the reciprocal of the volume-average diameter $1/d_v[t]$ varies linearly, or approximately linearly, with the time "t" (stable deagglomeration regime). The deagglomeration rate α is calculated by linear regression of the curve of the change of $1/d_v[t]$ as a function of the time "t", in the area of stable deagglomeration regime (in general, between about 4 and 8 min). It is expressed in $\mu m^{-1}/min$.

The aforementioned Application WO 99/28376 describes in detail a measurement device that can be used for carrying out this ultrasound deagglomeration test. It is recalled that this device consists of a closed circuit in which a stream of particle agglomerates in suspension in a liquid may circulate. This device essentially comprises a sample preparation unit, a laser particle size analyser and a treatment cell. Venting to atmospheric pressure, at the level of the sample preparation unit and the treatment cell itself, allows the continuous removal of air bubbles which are formed during the sonication (action of the ultrasound probe).

The sample preparation unit ("Malvern Small Sample Unit MSX1") is intended to receive the filler sample to be tested (in suspension in its liquid) and to make it flow through the circuit at the preset speed (potentiometer—maximum speed of around 3 l/min), in the form of a stream of liquid suspension. This preparation unit simply consists of a receiving tank which contains, and through which flows, the suspension to be analysed. It is equipped with an adjustable-speed stirrer motor, in order to avoid sedimentation of the particle agglomerates of the suspension; a mini centrifugal pump is intended to provide the circulation of the suspension in the circuit; the inlet of the preparation unit is connected to the open air via an opening intended to receive the filler sample to be tested and/or the liquid used for the suspension.

Connected to the preparation unit is a laser particle size analyser ("Mastersizer S") whose role is to continuously measure, at regular time intervals, the volume-average size "$d_v$" of the agglomerates during passage of the flow, thanks to a measurement cell to which the recording and automatic calculation means of the particle size analyser are connected. It is briefly recalled here that the laser particle size analysers exploit, in a known manner, the principle of the diffraction of light by solid objects suspended in a medium of which the refractive index is different from that of the solid. According to the Fraunhofer theory, there is a relationship between the size of the object and the diffraction angle of the light (the smaller the object, the higher the diffraction angle). Practically, it is sufficient to measure the amount of light diffracted for different diffraction angles in order to be able to determine the size distribution (by volume) of the sample, $d_v$ corresponding to the volume-average size of this distribution ($d_v = \Sigma(n_i \, d_i^4)/\Sigma(n_i \, d_i^3)$ with $n_i$ being the number of objects of the size or diameter grade $d_i$).

Lastly, inserted between the preparation unit and the laser particle size analyser is a treatment cell equipped with an ultrasound probe, which may function in continuous or pulsed mode, intended to continuously break up the agglomerates of particles during passage of the flow. This flow is thermostated via a cooling circuit disposed, at the level of the cell, in a jacket surrounding the probe, the temperature being controlled, for example, by a temperature probe immersed in the liquid at the level of the preparation unit.

I-2. Characterization of the Rubber Compositions a) Tensile Tests:

These tests make it possible to determine the elasticity stresses and the properties at break. Unless otherwise indicated, they are carried out in accordance with French Standard NF T 46-002 of September 1988. The measurements made, at first elongation (i.e. with no accommodation cycle—the moduli are then denoted by "M"), are the true secant moduli (i.e. calculated with respect to the actual cross section of the test specimen), expressed in MPa, at 100% elongation (moduli denoted by M100), and at 300% elongation (moduli denoted by M300). Also measured are the tensile strengths (in MPa) and the elongations at break (in %). All these tensile measurements are carried out under the standard temperature and moisture conditions (23±2° C.; 50±5% relative humidity—French Standard NF T 40-101 of December 1979).

Processing of the tensile recordings also allows the curve of modulus to be plotted as a function of the elongation (see appended FIGURE), the modulus used here being the true secant modulus measured at first elongation, calculated with respect to the actual cross section of the test specimen and not the initial cross section as before for the nominal moduli.

b) Dynamic Properties:

The dynamic properties are measured on a viscosity analyser (Metravib VA4000) according to Standard ASTM D5992-96. The response of a sample of vulcanised composition (cylindrical test specimen with a thickness of 2 mm and a cross section of 315 mm$^2$), subjected to a simple alternating sinusoidal shear stress, at a frequency of 10 Hz, at a temperature of 23° C., is recorded. A peak-peak strain amplitude sweep from 0.1% to 50% (outward cycle) and then from 50% to 0.1% (return cycle) was carried out; for the return cycle, the maximum value of the loss factor, denoted by $\tan(\delta)_{max}$ is recorded.

c) Rheometry:

The measurements are carried out at 150° C. with an oscillating-chamber rheometer according to the DIN 53529 Standard—Part 3 (June 1983). The variation of the rheometric torque as a function of time describes the variation of the stiffness of the composition as a result of the vulcanisation reaction. The measurements are processed according to the DIN 53529 Standard—Part 2 (March 1983). $T_i$ (in minutes) is the induction time, that is to say the time needed before the onset of the vulcanisation reaction; $T_\alpha$ (for example, $T_{99}$) is the time needed to reach a conversion of $\alpha\%$, that is to say $\alpha\%$ (for example 99%) of the difference between the minimum and maximum torques. The $1^{st}$ order conversion rate constant K (in min$^{-1}$) is also measured, calculated between 30% and 80% conversion, which makes it possible to assess the vulcanisation kinetics (the higher K is, the faster the kinetics).

II. CONDITIONS FOR IMPLEMENTING THE INVENTION

The rubber compositions according to the invention are based on the following constituents: (i) one (at least one) diene elastomer, (ii) one (at least one) reinforcing filler and (iii) one (at least one) coupling agent providing the bond between this filler and this diene elastomer, said filler comprising a reinforcing magnesium hydroxide as described in detail below.

Of course, the expression "composition based on" should be understood to mean a composition comprising the mixture and/or the reaction product, especially in situ, of the various base constituents, it being possible for some of these constituents to react and/or be intended to react together, at least partially, during the various phases of producing the composition, or during its subsequent curing.

In the present description, unless otherwise indicated, all the percentages (%) indicated are % by weight.

II-1. Diene Elastomer

The term "diene" elastomer or rubber is understood in a known manner to mean an elastomer derived at least partly (i.e. a homopolymer or a copolymer) from diene monomers, that is to say from monomers bearing two carbon-carbon double bonds, whether conjugated or not.

These diene elastomers may be classified in two categories: "essentially unsaturated" or "essentially saturated". "Essentially unsaturated" is generally understood to mean a diene elastomer derived at least partly from conjugated diene monomers, having a content of units of diene origin (conjugated dienes) which is greater than 15% (mol %); thus, diene elastomers such as butyl rubbers or diene/α-olefin copolymers of the EPDM type do not fall within the above definition and may in particular be termed "essentially saturated" diene elastomers (low or very low content of units of diene origin, always less than 15%). In the category of "essentially unsaturated" diene elastomers, the expression "highly unsaturated" diene elastomer is understood in particular to mean a diene elastomer having a content of units of diene origin (conjugated dienes) which is greater than 50%.

These definitions having been given, it will be understood more particularly that a diene elastomer that can be used in the compositions according to the invention means:

(a) any homopolymer obtained by polymerising a conjugated diene monomer having from 4 to 12 carbon atoms;
(b) any copolymer obtained by copolymerising one or more conjugated dienes with one another or with one or more vinylaromatic compounds, having 8 to 20 carbon atoms;
(c) any ternary copolymer obtained by copolymerising ethylene, an α-olefin having 3 to 6 carbon atoms with an unconjugated diene monomer having from 6 to 12 carbon atoms, such as, for example, the elastomers obtained from ethylene and propylene with an unconjugated diene monomer of the aforementioned type such as, in particular, 1,4-hexadiene, ethylidene norbornene and dicyclopentadiene; and
(d) any copolymer of isobutene and isoprene (butyl rubber) and also the halogenated, in particular chlorinated or brominated, versions of this type of copolymer.

Although the present invention applies to any type of diene elastomer, a person skilled in the art of tyres will understand that the present invention, in particular when the rubber composition is intended for a tyre tread, is preferably carried out with essentially unsaturated diene elastomers, in particular of the (a) or (b) type above.

Suitable conjugated dienes are in particular: 1,3-butadiene, 2-methyl-1,3-butadiene, 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene. Suitable vinylaromatic compounds are for example: styrene, ortho-, meta-, para-methylstyrene, the commercial "vinyltoluene" mixture, para-tert-butylstyrene, methoxystyrenes, chlorostyrenes, vinylmesitylene, divinylbenzene and vinylnaphthalene.

The copolymers may contain between 99% and 20% by weight of diene units and from 1% to 80% by weight of vinylaromatic units. The elastomers may have any microstructure which is a function of the polymerisation conditions used, especially the presence or absence of a modifying and/or randomising agent and the amounts of modifying and/or randomising agent used. The elastomers may be, for example, block, random, sequential or microsequential elastomers and may be prepared in dispersion or in solution; they can be coupled and/or star-branched or also functionalised with a coupling and/or star-branching or functionalising agent.

The following are suitable: polybutadienes, in particular those having a content of 1,2-units between 4% and 80% or those having a content of cis-1,4 units greater than 80%, polyisoprenes, butadiene/styrene copolymers and in particular those having a styrene content between 5% and 50% by weight and more particularly between 20% and 40%, a content of 1,2-bonds of the butadiene part between 4% and 65%, a content of trans-1,4 bonds between 20% and 80%, butadiene/isoprene copolymers and especially those having an isoprene content between 5% and 90% by weight and a glass transition temperature ($T_g$, measured according to ASTM D3418) of −40° C. to −80° C., isoprene/styrene copolymers and especially those having a styrene content between 5% and 50% by weight and a $T_g$ between −25° C. and −50° C. In the case of butadiene/styrene/isoprene copolymers the following are suitable: in particular those having a styrene content between 5% and 50% by weight and more particularly between 10% and 40%, an isoprene content between 15% and 60% by weight and more particularly between 20% and 50%, a butadiene content between 5% and 50% by weight and more particularly between 20% and 40%, a content of 1,2-units of the butadiene part between 4% and 85%, a content of trans-1,4 units of the butadiene part between 6% and 80%, a content of 1,2-units plus 3,4-units of the isoprene part between 5% and 70% and a content of trans-1,4 units of the isoprene part between 10% and 50%, and more generally any butadiene/styrene/isoprene copolymer having a $T_g$ between −20° C. and −70° C.

In summary, the diene elastomer of the composition according to the invention is preferably chosen from the group of highly unsaturated diene elastomers formed by polybutadienes (abbreviated to "BR"), synthetic polyisoprenes (IR), natural rubber (NR), butadiene copolymers, isoprene copolymers and blends of these elastomers. Such copolymers are more preferably chosen from the group formed by butadiene/styrene copolymers (SBR), isoprene/butadiene copolymers (BIR), isoprene/styrene copolymers (SIR) and isoprene/butadiene/styrene copolymers (SBIR).

The composition according to the invention is especially intended for a tyre tread, whether it is for a new or used (in the case of retreading) tyre.

When such a tread is intended in particular for a passenger vehicle tyre, the diene elastomer is preferably an SBR or an SBR/BR, SBR/NR (or SBR/IR), or else BR/NR (or BR/IR) blend (mixture). In the case of an SBR elastomer, an SBR is used, in particular, having a styrene content between 20% and 30% by weight, a content of vinyl bonds of the butadiene part between 15% and 65%, a content of trans-1,4 bonds between 15% and 75% and $T_g$ between −20° C. and −55° C., this SBR copolymer, preferably prepared in solution (SSBR), optionally being used as a blend with a polybutadiene (BR) preferably having more than 90% of cis-1,4 bonds.

According to another particular embodiment, the diene elastomer is predominantly (for more than 50 phe) an isoprene elastomer. This is the case in particular when the compositions of the invention are intended to form, in tyres, the rubber matrices of certain treads, for example for industrial vehicles, crown reinforcement plies (for example working plies, protective plies or hoop-reinforcing plies), carcass reinforcement plies, sidewalls, beads, protectors, underlayers, rubber blocks and other innerliners providing the interface between the aforementioned regions of the tyres.

The expression "isoprene elastomer" is understood to mean, in a known manner, an isoprene homopolymer or copolymer, in other words a diene elastomer chosen from the group formed by natural rubber (NR), synthetic polyisoprenes (IR), various isoprene copolymers and blends of these elastomers. Among the isoprene copolymers, mention may in particular be made of isobutene/isoprene (butyl rubber—IIR), isoprene/styrene (SIR), isoprene-butadiene (BIR) or isoprene/butadiene/styrene (SBIR) copolymers. This isoprene elastomer is preferably natural rubber or a synthetic cis-1,4-polyisoprene; among these synthetic polyisoprenes, use is preferably made of the polyisoprenes having a content (mol %) of cis-1,4 bonds greater than 90%, more preferably still greater than 98%, especially greater than 99%.

According to another advantageous embodiment of the invention, especially when it is intended for a tyre sidewall, the composition according to the invention may contain at least one essentially saturated diene elastomer, in particular at least one EPDM copolymer, whether this copolymer is, for example, or is not used as a blend with one or more of the aforementioned highly unsaturated diene elastomers.

The compositions of the invention may contain a single diene elastomer or a blend of several diene elastomers, the diene elastomer or elastomers may be used in combination with any type of synthetic elastomer other than a diene elastomer, or even with polymers other than elastomers, for example thermoplastic polymers.

II.2 Reinforcing Magnesium Hydroxide

The composition of the invention has a main feature of being reinforced by synthetic magnesium hydroxide particles, in the form of silica-covered wafers. It is recalled here that the magnesium hydroxide, except for the impurities and water of hydration, has the formula $Mg(OH)_2$.

Preferably, the amount of silica present at the surface of this Mg hydroxide represents between 5% and 50%, more preferably between 10% and 40%, in particular between 15% and 35% (% by weight of the total weight of hydroxide coated).

For an optimised compromise with respect to the processability of the compositions, their properties of hysteresis, reinforcement and wear resistance, in particular as a tyre, the BET specific surface area of this Mg hydroxide is preferably between 50 and 700 $m^2/cm^3$ (i.e. typically between 20 and 320 $m^2/g$), more preferably between 100 and 600 $m^2/cm^3$ (i.e. typically between 40 and 270 $m^2/g$), for example between 150 and 400 $m^2/cm^3$ (i.e. typically between 60 and 180 $m^2/g$); its weight-average particle size, denoted by $d_w$, is preferably between 20 and 400 nm, more preferably between 50 and 300 nm, for example between 100 and 200 nm.

On the other hand, the intrinsic dispersibility of a filler may be evaluated in a known manner using the ultrasound deagglomeration test described in the preceding chapter I. Preferably, the reinforcing magnesium hydroxide has a deagglomeration rate α greater than $1 \times 10^{-3}$ $\mu m^{-1}/min$, more preferably greater than $4 \times 10^{-3}$ $\mu m^{-1}/min$.

The reinforcing Mg hydroxide may be in any physical state, whether it is in the form of powder, micropearls, granules, pellets, beads or any other densified form, on condition obviously that the densification method does not impair the essential or preferred characteristics recommended for this filler.

The reinforcing Mg hydroxide used is composed of aggregates (more or less agglomerated together) having an anisometric form, that is to say having an aspect ratio $(A_1=L_1/T_1)$ preferably greater than 2.0, more preferably greater than 3.0, $L_1$ representing the average of the largest dimension (or average diameter if these wafers are in the form of discs) and $T_1$ the average thickness of said aggregates, these averages being calculated by number. More preferably still, $A_1$ is between 3 and 10.

According to one preferred embodiment, preferably combined with the preceding one, it is the primary particles themselves, constituents of the aggregates, which are anisometric and in the form of wafers, said primary particles having an aspect ratio $(A_2=L_2/T_2)$ greater than 1.5, more preferably greater than 2.0; $L_2$ represents the average diameter (or average of the largest dimension in the plane of the wafers) and $T_2$ the average thickness of said primary particles, these averages being calculated by number. More preferably still, $A_2$ is between 2 and 10.

$L_2$ is preferably between 10 and 400 nm and $T_2$ is preferably between 5 and 30 nm. More preferably, $L_2$ is in a range of 20 to 150 nm, and $T_2$ is in a range of 10 to 25 mm.

The reinforcing magnesium hydroxide is able to be prepared by any known process for coating a mineral or organic filler with silica, applied in the present case to a synthetic magnesium hydroxide.

Such a coating process preferably comprises the following steps:

starting from a suspension of magnesium hydroxide in a liquid;
synthesizing silica over the surface of the hydroxide particles; and
filtering the suspension obtained, washing and drying the filtrate.

The liquid of the suspension is preferably water, but it is possible to use any solvent, for example an alcohol (e.g. ethanol) suitable for the synthesis of silica. The concentration of the magnesium hydroxide suspension is preferably less than 20 g/l.

The filtrate is washed one or more times in water or the solvent used for the silica synthesis being specified that the last washing operation is preferably carried out in water.

The filtrate thus obtained is then dried with a drying means capable of limiting the agglomeration of the hydroxide particles during the removal of the water. The drying means that can be used are known to a person skilled in the art: the drying may be carried out, for example, by freeze-drying, by spray-drying or under supercritical conditions, or using any other equivalent means capable of avoiding an excessive agglomeration, through capillarity, of the hydroxide particles during the removal of the water.

By way of example, a coating process may be used that is inspired by at least one of the following known methods:

method of covering particles by hydrolysis of tetraethyl orthosilicate (TEOS) in alcohol (M. Ohmori and E. Matijevic, J. Colloid Inter. Sci. 160, 288-292 (1993)), a method itself deriving from the known process for silica synthesis under the identifier "Stoeber" (W. Stoeber, A. Fink, E. Bohm, J. Colloid Inter. Sci. 26, 62-69 (1968));

method for synthesizing silica from a sodium silicate ($Na_2SiO_3$) precursor as described, for example, in Patent Application EP-A-0 407 262; and method for covering carbon black with silica as described in Examples 1 and 2 of Patent Application WO 00/05312.

It should be noted that when magnesium hydroxide is synthesized from scratch, it is preferable not to dry its particles before carrying out the above coating process, so as to limit as much as possible the risk of the particles agglomerating together before deposition of this silica surface layer.

The reinforcing magnesium hydroxide described above may form all or only a part of the total reinforcing filler, in the latter case combined, for example, with another inorganic reinforcing filler such as a silica, especially HDS, or with conventional carbon black.

Preferably, the reinforcing magnesium hydroxide forms the majority, that is to say more than 50% by weight, of the total reinforcing filler. Advantageously, it represents more than 80%, even more preferably more than 90% of the total reinforcing filler. It may advantageously form 100% of the inorganic reinforcing filler, for example combined with a very small amount of carbon black as indicated below.

The expression "inorganic reinforcing filler" is understood here to mean an inorganic or mineral filler regardless of its colour and its origin (natural or synthetic), also known as a "white" filler, "light" filler or else "non-black" filler, in contrast to carbon black, this inorganic filler being capable of reinforcing, by itself, without a means other than an intermediate coupling agent, a rubber composition intended for the manufacture of tyres, in other words capable of replacing, in its reinforcing role, a conventional tyre-grade carbon black filler.

As possible complementary inorganic reinforcing fillers, the following are particularly suitable: mineral fillers of the siliceous type, in particular silica (SiO$_2$), or of the aluminous type, in particular alumina (Al$_2$O$_3$). The silica used may be any reinforcing silica known to a person skilled in the art, especially any precipitated or pyrogenic silica having a BET surface area and a CTAB specific surface area that are both less than 450 m$^2$/g, preferably less than 30 to 400 m$^2$/g. As examples of highly dispersible (known as "HD") precipitated silicas, mention may for example be made of the silicas Ultrasil 7000 and Ultrasil 7005 from Degussa, the silicas Zeosil 1165MP, 1135MP and 1115MP from Rhodia, the silica Hi-Sil EZ150G from PPG, the silicas Zeopol 8715, 8745 and 8755 from Huber. As examples of reinforcing aluminas, mention may be made of the aluminas A125 or CR125 Baikalox from Baïkowski, APA-100RDX from Condea, Aluminoxid C from Degussa or AKP-G015 from Sumitomo Chemicals.

As indicated previously, the reinforcing magnesium hydroxide may be used combined with a carbon black, for example a black of the HAF, ISAF, SAF, type conventionally used in tyres and particularly in tyre treads (for example blacks N115, N134, N234, N326, N330, N339, N347, N375, or else, depending on the intended applications, blacks of higher series, for example N660, N683, N772).

The amount of carbon black present in the total reinforcing filler may vary over a wide range, it is preferably less than that of the reinforcing Mg hydroxide.

Advantageously, it is possible to use, as a blend (mixture) with the reinforcing magnesium hydroxide, a carbon black at a very low content, preferably a content less than 10 phe, more preferably less than 6 phe, for example between 0 and 3 phe (parts by weight per hundred parts of elastomer). Within the ranges indicated, the composition benefits from the colouring (black pigmenting agent) and UV-stability properties of the carbon blacks, without moreover prejudicing the typical performance characteristics provided by the reinforcing magnesium hydroxide.

Preferably, the total content of reinforcing filler in the compositions of the invention is in a range from 20 to 400 phe, more preferably from 30 to 200 phe. The optimum is in fact different depending on the intended applications: in a known manner, the level of reinforcement expected with regard to a bicycle tyre, for example, is markedly less than that required with regard to a tyre for a passenger vehicle or for a utility vehicle such as a heavy goods vehicle.

When the compositions of the invention are intended for tyre treads, the content of inorganic reinforcing filler, therefore of reinforcing magnesium hydroxide when the latter constitutes all of this reinforcing filler, with or without a small amount of carbon black in addition, is preferably chosen to be greater than 50 phe, for example between 50 and 150 phe.

II-3. Coupling Agent

It is well known to a person skilled in that art that it is necessary to use, in the case of an inorganic reinforcing filler, a coupling agent also known as a bonding agent, which has the role of ensuring the bonding or "coupling" between the inorganic filler and the elastomer, while facilitating the dispersion of this inorganic filler within the elastomeric matrix.

The reinforcing magnesium hydroxide also requires the use of such a coupling agent to ensure its reinforcing filler role in the rubber compositions according to the invention.

The expression "coupling agent" is understood more specifically to mean an agent able to establish a sufficient connection, of chemical and/or physical nature, between the filler in question and the elastomer; such a coupling agent, which is at least bifunctional, has for example a simplified general formula of "Y-T-X", in which:

Y represents a functional group ("Y" function) which is capable of being physically and/or chemically bonded to the inorganic filler, such a bond possibly being established, for example, between a silicon atom of the coupling agent and the hydroxyl (OH) groups of the surface of the inorganic filler;

X represents a functional group ("X" function) capable of being physically and/or chemically bonded to the elastomer, for example via a sulphur atom; and T represents a group enabling Y and X to be bonded together.

The coupling agents must not in particular be confused with simple agents for covering the filler in question which, in a known manner, may comprise the Y function that is active with respect to the filler but are lacking the X function that is active with respect to the elastomer.

Such coupling agents, of variable efficacy, have been described in a very large number of documents and are well known to a person skilled in the art. It is possible to use in fact any coupling agent capable of effectively providing the bond or coupling between an inorganic reinforcing filler such as silica and a diene elastomer, such as for example an organosilane, especially a sulphur-containing alkoxysilane, or else an at least bifunctional polyorganosiloxane (bearing the aforementioned X and Y functions).

Silica/elastomer coupling agents, in particular, have been described in a large number of documents, the most well known being bifunctional alkoxysilanes such as sulphur-containing alkoxysilanes. In particular, sulphur-containing alkoxysilanes are used which are known as "symmetrical" or "asymmetrical" sulphur-containing alkoxysilanes depending on their particular structure, such as described, for example, in patent applications or patents U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, or in the most recent documents U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085, WO 02/083782 or which express in detail such known compounds.

Particularly suitable for implementing the invention, without the definition below being limiting, are symmetrical alkoxysilane polysulphides corresponding to the following general formula (I):

in which:

n is an integer from 2 to 8 (preferably from 2 to 5);

A is a divalent hydrocarbon-based radical (preferably C$_1$-C$_{18}$ alkylene groups or C$_6$-C$_{12}$ arylene groups, more particularly C$_1$-C$_{10}$, especially C$_1$-C$_4$, alkylenes, in particular propylene); and Z responds to one of the formulae below:

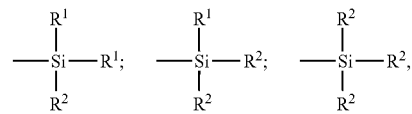

in which:

the $R^1$ radicals, which are substituted or unsubstituted, and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl or cyclohexyl or phenyl groups, especially $C_1$-$C_4$ alkyl, more particularly methyl and/or ethyl, groups); and the $R^2$ radicals, which are substituted or unsubstituted, and identical to or different from one another, represent a hydroxyl, $C_1$-$C_{18}$ alkoxyl or $C_5$-$C_{18}$ cycloalkoxyl group (preferably hydroxyl, $C_1$-$C_8$ alkoxyl or $C_5$-$C_8$ cycloalkoxyl groups, more preferably hydroxyl or $C_1$-$C_4$ alkoxyl groups, in particular hydroxyl, methoxyl and/or ethoxyl groups).

In the case of a mixture of alkoxysilane polysulphides corresponding to the formula (I) above, especially standard commercially available mixtures, the average value of the "n" is a fraction preferably between 2 and 5, more preferably close to 4. But the invention may also advantageously be implemented, for example, with alkoxysilane disulphides (n=2).

As examples of silane polysulphides, mention will more particularly be made of bis-(($C_1$-$C_4$)alkoxyl($C_1$-$C_4$)alkyl($C_1$-$C_4$)silylalkyl) polysulphides (especially disulphides, trisulphides or tetrasulphides), such as for example bis(3-trimethoxysilylpropyl) or bis(3-triethoxysilylpropyl) polysulphides such as bis(3-triethoxysilylpropyl) tetrasulphide, abbreviated to TESPT, of formula $[(C_2H_5O)_3Si(CH_2)_3S_2]_2$ or bis(triethoxysilylpropyl) disulphide, abbreviated to TESPD, of formula $[(C_2H_5O)_3Si(CH_2)_3S]_2$.

TESPD is sold, for example, by Degussa under the trade name Si75 (in the form of a mixture of disulphide—75 wt %—and polysulphides), or else by Witco under the trade name Silquest A1589. TESPT is sold, for example, by Degussa under the trade name Si69 (or X50S when it is borne at 50 wt % on carbon black), or else by Osi Specialties under the trade name Silquest A1289 (in both cases, a commercial mixture of polysulphides with an average value for n which is close to 4).

Mention will also be made, as preferred coupling agents, of bis(($C_1$-$C_4$)monoalkoxyl($C_1$-$C_4$)dialkylsilylpropyl) polysulphides (especially disulphides, trisulphides or tetrasulphides), more particularly bis(monoethyoxydimethylsilylpropyl) tetrasulphide as described in Application WO 02/083782.

As examples of coupling agents other than the aforementioned alkoxysilane polysulphides, mention will especially be made of bifunctional polyorganosiloxanes as described, for example, in Applications WO 99/02602 or WO 01/96442, or else the hydroxysilane polysulphides ($R^2$ then represents OH in formula (I) above) as described in Applications WO 02/30939 and WO 02/31041.

A person skilled in the art will know how to adjust the content of coupling agent in the compositions of the invention as a function of the intended application, the nature of the elastomer used and the amount of reinforcing Mg hydroxide, supplemented where appropriate with any other inorganic filler used as a complementary reinforcing filler.

The level of coupling agent, with respect to the weight of the diene elastomer, is preferably between 0.1 and 15 phe, more preferably between 0.5 and 10 phe.

The coupling agent used could be pregrafted (via the X functional group) onto the diene elastomer of the composition of the invention, the elastomer thus functionalised or precoupled then comprising the free Y functional group for the reinforcing magnesium hydroxide. The coupling agent could also be pregrafted (via the Y functional group) onto the reinforcing magnesium hydroxide, the thus "precoupled" filler then being able to be linked to the diene elastomer via the free X functional groups. However, it is preferred to use the coupling agent in the free state (i.e. ungrafted) or grafted to the reinforcing magnesium hydroxide, especially for reasons of better processing of the compositions in the uncured state.

II.4 Various Additives

The compositions according to the invention may contain, besides the compounds already described, the additives commonly used in diene rubber compositions intended for manufacturing ground-contact systems of motor vehicles, in particular tyres, such as for example plasticisers or extender oils, whether the latter are of aromatic or non-aromatic nature, especially oils that are very slightly aromatic or are non-aromatic (e.g. naphthenic or paraffin oils, MES or TDAE oils) and/or hydrocarbon-based plasticising resins having a high $T_g$ (preferably above 30° C.), glycerol esters (in particular trioleates), antioxidant-type protective agents, antiozonants, anti-fatigue agents, coupling activators, methylene acceptors and donors, bismaleimides or other reinforcing resins such as described, for example in WO 02/10269, a crosslinking system based either on sulphur, or sulphur and/or peroxide donors, vulcanisation accelerators, vulcanisation activators, systems promoting the adhesion of the rubber to metal or textile surfaces, anti-reversion agents such as, for example, sodium hexathiosulphonate or N,N'-m-phenylene-biscitraconimide, etc. A person skilled in the art will know how to adjust the formulation of the composition as a function of their particular requirements.

It is also possible to add to the reinforcing magnesium hydroxide described above, depending on the intended application, inert (i.e. non-reinforcing) fillers such as clay, bentonite, talc, chalk or kaolin particles that can be used for example in the sidewalls or treads of coloured tyres.

The rubber compositions according to the invention may also contain, in addition to the aforementioned coupling agents, covering agents (comprising, for example, just the Y functional group) for the reinforcing Mg hydroxide or more generally processing aids that are capable, thanks to an improvement in the dispersion of the filler in the rubber matrix and to a lowering of the viscosity of the compositions, of improving their processability in the uncured state, these agents, used for example at a preferred content between 0.5 and 3 phe, being for example alkylalkoxysilanes (especially alkyltriethoxysilanes such as for example the 1-octyltriethoxysilane sold by Degussa-Hüls under the trade name Dynasylan Octeo or the 1-hexadecyltriethoxysilane sold by Degussa-Hüls under the trade name Si216), polyols, polyethers (for example polyethylene glycols), primary, secondary or tertiary amines (for example trialkanolamines), hydroxylated or hydrolysable polyorganosiloxanes, for example α,ω-dihydroxypolyorganosiloxanes (especially α,ω-dihydroxypolydimethylsiloxanes).

II.5 Preparation of the Rubber Compositions

The compositions are manufactured in suitable mixers, using two successive preparation stages well known to a person skilled in the art: a first thermomechanical working or kneading stage (known as a "non-productive" stage) at high temperature, up to a maximum temperature (denoted by $T_{max}$) between 110° C. and 190° C., preferably between 130° C. and 180° C., followed by a second mechanical working stage (known as a "productive" stage) at a lower temperature, typically below 110° C., for example between 60° C. and 100° C., during which finishing stage the crosslinking or vulcanisation system is incorporated.

The manufacturing process according to the invention is characterized in that at least the reinforcing filler and the coupling agent are incorporated, by kneading, into the diene elastomer during the first so-called non-productive stage, that is to say that at least these various base constituents are introduced into the mixer and are thermomechanically kneaded, in one or more steps, until a maximum temperature between 110° C. and 190° C., preferably between 130° C. and 180° C., is reached.

As an example, the first (non-productive) stage is carried out in a single thermomechanical step during which all the base constituents required, the optional complementary covering agents or processing aids and various other additives, with the exception of the vulcanisation system, are introduced into a suitable mixer such as a standard internal mixer. The total kneading time, in this non-productive stage, is preferably between 1 and 15 min. After cooling of the mixture thus obtained, the vulcanisation system is then incorporated at low temperature generally in an external mixer such as an open mill; all the ingredients are then mixed (productive stage) for several minutes, for example between 2 and 15 mins.

The final composition thus obtained is then calendered, for example in the form of a film or sheet, especially for laboratory characterisation, or else extruded, to form, for example, a rubber profile used for manufacturing semi-finished products such as treads, crown plies, sidewalls, carcass plies, beads, protectors, inner tubes or airtight innerliners for tubeless tyres.

The vulcanisation (or curing) is carried out in a known manner at a temperature generally between 130° C. and 200° C., under pressure, for a sufficient time which may vary, for example, between 5 and 90 mins as a function in particular of the curing temperature, the vulcanisation system used, the vulcanisation kinetics of the composition in question or else the size of the tyre.

The vulcanisation system itself is preferably based on sulphur and a primary vulcanisation accelerator, in particular an accelerator of sulphenamide type. It is possible to add to this base vulcanisation system, incorporated during the first non-productive stage and/or during the productive stage, various known secondary vulcanisation accelerators or vulcanisation activators such as, for example, zinc oxide, stearic acid, guanidine derivatives, etc. Sulphur is used at a preferred content between 0.5 and 10 phe, more preferably between 0.5 and 5.0 phe, for example between 0.5 and 3.0 phe when the invention is applied to a tyre tread. The primary vulcanisation accelerator is used at a preferred content between 0.5 and 10 phe, more preferably between 0.5 and 5.0 phe, in particular when the invention applies to a tyre tread.

It goes without saying that the invention relates to the rubber compositions described previously both in the "uncured" state (i.e. before curing) and in the "cured" or vulcanised state (i.e. after crosslinking or vulcanisation).

The compositions according to the invention may be used alone or as a mixture with any other rubber composition that can be used for manufacturing tyres.

III. EXEMPLARY EMBODIMENTS OF THE INVENTION

III-1. Synthesis of Reinforcing Magnesium Hydroxide

Material Used:
  5-liter jacketed reactor;
  stirrer motor (Heidolf);
  thermostated bath;
  centrifugal drier (Rousselet—type RC30VxR);
  freeze drier (Christ Gamma 2-20);
  two peristaltic pumps (Masterflex L/S); and
  pH meter (Mettler Toledo MP225).
Precursors Used:
  $MgCl_2.6H_2O$ (Alfa);
  2M NaOH (Prolabo);
  deionized $H_2O$;
  $Na_2SO_4$ (Fluka)
  $Na_2SiO_3$ in solution (Prolabo—density 1.33%; 26% $SiO_2$—8% $Na_2O$); and
  $H_2SO_4$ (Merck—purity 95-97%).
Procedure:

The starting magnesium hydroxide (filler referenced as "B" in the following tests) was formed of secondary particles (i.e. aggregates) themselves formed of primary particles in the form of wafers having an aspect ratio $A_2$ equal to around 5 (estimated average values: $L_2$ is equal to around 75 nm and $T_2$ to around 15 nm); these secondary particles have the density and BET surface area properties indicated in the appended Table 1.

It was synthesized according to the known procedure described in "*Effect of pH on the growth of Mg(OH)$_2$ crystals in aqueous environment at 60° C.*", V. A. Phillips, J. L. Kolbe and H. Opperhauser, Journal of Crystal Growth 41 (1977) 228-234.

The synthesis was carried out in greater detail as follows: introduced into a 5 l (liter) reactor, equipped with a jacket, were 2.46 l of an aqueous solution (1 mol/l) of $MgCl_2$. The temperature of the medium was controlled at 20° C. by a thermostated bath connected to the jacket. Homogenisation of the reaction medium was provided by a Teflon® six-sided blade, coupled to a motor rotating at a speed of 350 rpm. 2.46 l of NaOH (2M) were then introduced via a peristaltic pump at a flow rate of 1.8 l/min. The addition of NaOH lasted around 2 min. At the end of this addition, stirring of the reaction medium was maintained for 1 hour. The suspension was then dried using the centrifugal drier. In order to form a cake, the suspension was introduced into the drier (600 rpm) using a peristaltic pump (flow rate (30 ml/min). For washing the cake the rotation of the centrifuge was 1000 rpm. The introduction of washing water was carried out at a flow rate of 60 ml/min. In total, 30 liters of water were used for the washing, the last washing water having a pH of around 7. The final drying took place at 1000 rpm.

One part of the product, namely around 100 g, thus obtained was then frozen at −18° C. then freeze-dried under the following conditions: 48 h of main drying at a temperature of −15° C. and under 1.030 mbar, then 12 h of final drying at 0° C. and under a dynamic vacuum (for example, less than 0.01 mbar). This product which is in powder form will be used for the physicochemical analysis.

The remaining mass of the cake, namely 1.2 kg, was redispersed in a volume of 500 ml of water, homogenized on a roller bed for six hours, than used for the following step for coating silica.

This filler, referenced filler B in the following tests, has the density and BET surface area properties indicated in the appended Table 1.

The method of coating via the silica then applied to this filler B, in order to obtain the filler according to the invention referenced D in the following tests, is inspired by the process for synthesis of silica described in the aforementioned Patent document EP-A-0 407 262.

The preferred process for thus coating the particles of filler B with uniform layers of silica essentially comprises the following steps:

starting from a suspension of Mg hydroxide in water;
filtering and washing the filtrate with water;
dispersing the filtrate in water (in an amount preferably less than 20 g/l, for example around 5 to 10 g/l);
adding an electrolyte such as, in particular, an alkali metal salt (e.g. $Na_2SO_4$ as described for example in WO 97/40106);
adding a first weakly concentrated solution (for example less than 100 g/l) of Na silicate ($Na_2SiO_3$);
adding a second more concentrated solution (preferably at least two times more concentrated than the first) of Na silicate, while at the same time keeping the pH at a value equal to around 9;
then adding an acid (e.g. $H_2SO_4$) to lower the pH to a value between 7 and 8;
stirring (typically for 2 hours) at pH=7.5 and at 75° C.; and
washing and drying the final product.

This was carried out in greater detail as follows: in a 5 l reactor, equipped with a jacket, the suspension of $Mg(OH)_2$ (coming directly from the synthesis described above) was diluted in 2.7 l of water in order that the concentration of the suspension be close to 5 g/l (as an example, 300 g of a 5 wt % suspension were dispersed in 2.7 l of water). The homogenisation of the reaction medium was ensured by a Teflon® six-sided blade, coupled to a motor rotating at a speed of 400 rpm. The temperature of the medium was controlled at 75° C. by a thermostatic bath connected to the jacket. The pH of the suspension was measured at 8.7.

Four solutions, denoted by sol.A, sol.B, sol.C and sol.D were prepared as follows:

sol.A: 2.1 g of $Na_2SO_4$ in 1.920 l of bidistilled water;
sol.B: 5.92 g of sodium silicate, namely a volume of 4.45 ml diluted in a volume of 100 ml with bidistilled water, this solution having a final concentration of 14.8 g/l of silica (namely 56 g/l of silicate);
sol.C: 20 g of sodium silicate, namely a volume of 15 ml diluted in a volume of 40 ml with bidistilled water, this solution having a final concentration of 130 g/l of silica (namely 363 g/l of silicate); and
sol.D: 44 ml of a solution of $H_2SO_4$ at 95-97% purity, diluted in a volume of 1 l with bidistilled water.

Using a funnel, the solutions sol.A and sol.B were introduced into the reactor, the pH increased slightly, up to around 9. The mixture was then homogenised for 10 min, the stirrer motor still rotating at a speed of 400 rpm. Then, using two peristaltic pumps, the solutions sol.C and sol.D were added simultaneously with respective flow rates of 6 and 8 ml/min. The pH value of the suspension was constant and equal to 9 during these additions. Once the solution C had been introduced completely into the reactor, the addition of the solution D at a flow rate of 8 ml/min was continued to a pH of 7.5 (around 3 min).

The suspension thus obtained continued to be stirred at 75° C. for a further 2 h. It was then dried using the centrifugal drier. In order to form the cake, the suspension was introduced into the drier (1030 rpm) using a peristaltic pump (flow rate 100 ml/min). Two passes were needed to recover the solid phase, the pH of the filtration waters was around 7.7. In order to wash the cake, the rotational conditions of the centrifuge were 1030 rpm. The introduction of the washing waters was carried out with a flow rate of 130 ml/min. In total, 5 l of water were used for washing, the latest washing water having a pH of around 7. The final drying took place at the speed of 1030 rpm.

The product thus obtained was then frozen at −18° C. then freeze-dried under the following conditions: 48 h of main drying at −15° C. and 1030 mbar; then 12 h of final drying at 0° C. and under a dynamic vacuum. The product was homogenised on a roller bed.

Thus, $Mg(OH)_2$ wafers covered with silica were obtained, these wafers containing 3% of water (% of water determined by thermogravimetry at 105° C. over 40 min).

This filler D has the density and BET surface area properties indicated in the appended Table 1. In particular, it should be noted that the specific surface area of the silica-covered wafers is significantly increased with respect to that of the crude, non-covered wafers.

Its average size (by weight) of the particles $d_w$ and its deagglomeration rate α were respectively equal to 122 nm, and $6.5×10^{-3}$ $μm^{-1}$/min.

For the SEM (scanning electron microscope) evaluation, by way of example the following procedure was applied: a test sample of 16 mg of filler was dispersed over 8 min with a 600 W ultrasound probe (pulsed mode 1 s/1 s) in 40 ml of isopropanol. A drop of the suspension was deposited on a first nickel grid covered with a solid carbon ("formvar") membrane, then on to a second copper grid covered with a pierced carbon membrane. The observations were carried out on a Philipps SEM (ref. CM 200) operating under a voltage of 200 kV and equiped with a digital camera.

The SEM analysis shows that the particles keep their wafer morphology after the silica coating. They are more specifically in the form of aggregates and/or agglomerates of which the elementary particles are in the form of wafers having an average diameter "D" of around 75 nm and an average thickness "T" of around 15 nm. The aspect ratio of these wafers is therefore equal to around 5.

An X-ray diffraction diagram (RIGAKU rotating anode generator—RU300; Cu tube λ=1.5418 Å; P=40 kV×200 mA, Ni filter) revealed the presence of the predominant brucite phase and an amorphous silica halo. Analysis by X-ray fluorescence (Philipps "PW1400" spectrometer with λ dispersion and Sc anode tube), carried out on a sample containing a few mg of powder was compacted under 10 T of pressure with boric acid in order to form a pellet, gave a weight percentage of silica of around 25%.

Finally, an NMR analysis easily made it possible to verify that the silica layer was clearly solidly attached to the Mg hydroxide via covalent bonds. The NMR spectra were obtained in a known manner on a Bruker ASX 200 MHz spectrometer, equipped with a 4.7 Tesla superconducting magnet (Larmor frequency of the silicon equal to 39.76 MHz). To acquire the signal, the samples, in powder form, were placed in a (rotating) cylindrical sample holder of around 0.3 $cm^3$ made of zirconium oxide, which spun at the magic angle at a frequency of 4 kHz. During the observation of this signal, high-power decoupling was used to average the proton-silicon interactions to zero. The NMR spectrum showed a broad peak between −70 and −110 ppm containing both the signatures of the Si—O—Si bonds (−99 and −110 ppm) and of the Si—O—Mg bonds (−75, −85 and −93 ppm).

III-2. Preparation of the Compositions

The compositions tested below were prepared in a known manner, in the following way: the diene elastomer (or the blend of diene elastomers where appropriate) was introduced into an internal mixer filled to 75%, of which the initial temperature of the chamber was around 90° C.; then, after a suitable kneading time, for example of around 1 min, all the other ingredients were added, including the filler and the associated coupling agent, except for the vulcanisation system. Thermomechanical working was then carried out for a duration of around 10 min, with an average speed of the paddles of 70 rpm, until a drop temperature of about 160° C. was obtained.

The mixture thus obtained was recovered, cooled, then the vulcanisation system (sulphur and sulphenamide-type primary accelerator) was added to it in an external mixer (homo-finisher) at 40° C., the entire mixture being mixed (productive stage) for a suitable time, between 5 and 12 minutes depending on the case.

The compositions thus obtained were then calendered either in the form of rubber sheets (to the thickness of 2 to 3 mm) for the measurement of their mechanical properties, or extruded in the form of tyre treads. The vulcanisation (curing) was carried out at 150° C. for 40 min, under pressure.

In the following tests, the reinforcing magnesium hydroxide is used at a preferred content greater than 50 phe; it moreover makes up all or at least more than 90% by weight of all of the reinforcing filler, a minor fraction (less than 10%) of the latter being formed, for example, from carbon black.

III-3. Tests

The first objective of this test is to demonstrate the superiority of a reinforcing magnesium hydroxide as described previously, especially in comparison with a conventional HDS silica, in particular from the point of view of the curing kinetics.

For this, four compositions that can be used for manufacturing treads were compared. The diene elastomer was an SBR prepared in solution (SSBR), comprising 25% by weight of styrene, the polybutadiene units present being 40% of 1,2-polybutadiene units and 39% of trans-1,4-polybutadiene units.

These four compositions were identical except for the nature of the filler used:
  composition C-1: filler A—silica;
  composition C-2: filler B—$Mg(OH)_2$;
  composition C-3: filler C (50/50 blend by volume of fillers A & B); and
  composition C-4: filler D (filler B covered with silica).

Only composition C-4 is therefore according to the invention.

The HDS silica (filler A) chosen for the control composition C-1 was a tyre-grade silica having, in a known manner, a very high reinforcing power (Zeosil type 1165MP from Rhodia), commonly used to reinforce the treads of energy-saving passenger vehicle tyres.

In these compositions C-1 to C-4, the various fillers have been introduced at iso-volume fraction (namely with an identical volume occupied by the filler); the TESPT coupling agent was introduced at an approximately equivalent degree of surface coating (around $9.3 \times 10^{-7}$ mol/m$^2$), by taking into account the differences in the density and BET surface area of the fillers used, with respect to the silica of the control composition C-1.

Tables 2 and 3 successively give the formulation of the various compositions (Table 2—contents of various products expressed in phe), their properties before and after curing at 150° C. for 40 min (Table 3).

Examination of the results from Table 3 and of the curves from the single appended FIGURE lead firstly to the following observations and conclusions regarding the compositions C-2 (filler B) and C-3 (filler C) that do not conform to the invention:

firstly, the $Mg(OH)_2$ particles, alone (composition C-2 and curve C2) or as a blend with silica (composition C-3 and curve C3), result in a very clearly inadequate reinforcement, illustrated especially by the moduli values under high elongation (M100 and M300) and the ratio of these moduli (M300/M100) which are very greatly deteriorated, in comparison with the control composition (composition C-1 and curve C1);
  the shape of the strength-elongation curves C2 and C3, and also the properties at break, compared with the control curve C-1, only confirm to a person skilled in the art the preceding conclusion (near absence of reinforcement); and
  the low values of $\tan(\delta)_{max}$ of the compositions C-2 and C-3 are simply explained by the very low reinforcing power of their fillers (filler B or filler C=A+B).

On the contrary, the composition C-4 according to the invention (filler D), compared to the control composition C-1 (HDS silica), itself displays a compromise of properties which, unexpectedly is greatly improved, in particular in terms of vulcanisation properties:
  it is firstly characterized by moduli under high elongation (M100 and M300) and a ratio of these moduli (M300/M100) which are close, by a hysteresis ($\tan(\delta)_{max}$) that is also close, as clear indicators for a person skilled in the art of a high reinforcing power of the filler D;
  the shape of the curve C4, compared to the control curve C1, and also the mechanical properties at break, only confirm to a person skilled in the art the preceding conclusion (tensile curve moved quite clearly upwards);
  finally, also quite unexpectedly, the composition of the invention C-4 displays vulcanisation kinetics (illustrated by the parameter K) which are substantially increased (factor of around 2.6) relative to the HDS silica, thus bringing these kinetics up to the values commonly encountered for equivalent rubber compositions reinforced with carbon blacks; and
  the composition C-4 of the invention finally has the significant advantage of combining, with its greatly improved curing kinetics K, a curing time (illustrated by $T_{99}$) two times shorter and a scorch safety time which at the same time remains perfectly industrially acceptable ($T_i$=6.7 min).

Optical microscope photographs (reflection microscopy, for example at 40× magnification) of samples of compositions C-1 to C-4 above, in the vulcanised state, unquestionably prove the excellent dispersibility of the filler D, at least equal if not better to that of the reference HDS silica (filler A), very greatly improved with respect to the two other fillers tested (fillers B and C).

Thus, the reinforcing magnesium hydroxide previously described offers, to the compositions of the invention, an advantageous and unexpected compromise of properties, properties which could have in no way predicted, as demonstrated in the preceding examples, the results obtained to date with metallic hydroxides, especially with Mg hydroxides or even with mixtures of such hydroxides with HDS silicas.

The anisometry of the reinforcing magnesium hydroxide particles is furthermore capable of conferring, depending on the forming process used (for example calendering, extrusion), an advantageously high anisotropy to the compositions of the invention, easily identifiable, for example, by comparison of the tensile or compressive rigidities in various directions. Such an anisotropy can advantageously be used to decouple the mechanical properties of the compositions, and therefore adjust the response of the latter to specific stress modes which may be applied to them.

To date, it was generally accepted that anisometric fillers were inadequately reinforcing, unable due to their relatively large size to replace, in a true role of reinforcing filler, a conventional filler for a tyre such as carbon black or an HDS silica. However, thanks to the invention, it is therefore now possible to combine, with one and the same filler, reinforcement and anisotropy of properties of the rubber compositions.

TABLE 1

| Filler: | A | B | D |
|---|---|---|---|
| He Density (g/cm$^3$) | 2.15 | 2.33 | 2.30 |
| BET Surface area (m$^2$/g) | 155 | 75 | 131 |
| BET Surface area (m$^2$/cm$^3$) | 333 | 175 | 301 |

TABLE 2

| Composition No: | C-1 | C-2 | C-3 | C-4 |
|---|---|---|---|---|
| SSBR (1) | 100 | 100 | 100 | 100 |
| Filler A | 52.5 | — | 26.3 | — |
| Filler B | — | 57 | 28.5 | — |
| Filler D | — | — | — | 57.5 |
| Coupling agent (2) | 4.2 | 2.3 | 3.3 | 4.3 |
| Carbon black (N234) | 2 | 2 | 2 | 2 |
| ZnO | 2.5 | 2.5 | 2.5 | 2.5 |
| Stearic acid | 2 | 2 | 2 | 2 |
| Antioxidant (3) | 1.9 | 1.9 | 1.9 | 1.9 |
| Sulphur | 1.5 | 1.5 | 1.5 | 1.5 |
| Accelerator (4) | 2.5 | 2.5 | 2.5 | 2.5 |

(1) SBR solution;
(2) TESPT (Si69 from Degussa-Hüls);
(3) N-1,3-dimethylbutyl-N-phenyl-para-phenylenediamine (Santoflex 6-PPD from Flexsys);
(4) N-cyclohexyl-2-benzothiazylsulphenamide (Santocure CBS from Flexsys).

TABLE 3

| Composition No: | C-1 | C-2 | C-3 | C-4 |
|---|---|---|---|---|
| M100 | 6.6 | 4.7 | 5.4 | 8.0 |
| M300 | 19.8 | 5.4 | 9.7 | 22.1 |
| M300/M100 | 3.0 | 1.1 | 1.8 | 2.8 |
| Tensile strength (MPa) | 16.2 | 3.9 | 6.6 | 16.1 |
| Elongation at break (%) | 320 | 287 | 277 | 290 |
| T$_i$(min) | 8.6 | 2.7 | 5.1 | 6.7 |
| T$_{99}$(min) | 36 | 17 | 21 | 17 |
| K(min$^{-1}$) | 0.167 | 0.316 | 0.297 | 0.432 |
| K(relative units) | 100 | 189 | 178 | 259 |
| Tan($\delta$)$_{max}$ | 0.216 | 0.149 | 0.184 | 0.238 |

The invention claimed is:

1. A rubber composition based on at least one diene elastomer, a reinforcing filler and a coupling agent, wherein said reinforcing filler comprises synthetic magnesium hydroxide Mg(OH)$_2$ covered with silica, wherein the synthetic magnesium hydroxide Mg(OH)$_2$ has a specific surface area, measured by a BET method, between 60 and 180 m$^2$/g, and wherein the synthetic magnesium hydroxide Mg(OH)$_2$ is composed of aggregates agglomerated together, the aggregates include magnesium hydroxide Mg(OH)$_2$ particles which are anisometric and in the form of wafers, and the magnesium hydroxide Mg(OH)$_2$ particles have an aspect ratio (A$_2$=L$_2$/T$_2$) greater than 1.5, L$_2$ and T$_2$ respectively representing the number-average length and thickness of the particles.

2. The composition according to claim 1, the diene elastomer being selected from the group consisting of polybutadienes, synthetic polyisoprenes, natural rubber, butadiene/styrene copolymers, butadiene/isoprene copolymers, isoprene/styrene copolymers, butadiene/styrene/isoprene copolymers and blends of these elastomers.

3. The composition according to claim 1, the coupling agent being a silane or a polysiloxane that is at least bifunctional.

4. The composition according to claim 1, the amount by weight of silica at the surface of the magnesium hydroxide wafers representing between 5% and 50% of the total weight of the wafers.

5. The composition according to claim 1, the amount of magnesium hydroxide in said composition being greater than 50 phe.

6. The composition according to claim 1, said aggregates being in the form of wafers having an aspect ratio (A$_1$=L$_1$/T$_1$) greater than 2.0, L$_1$ and T$_1$ respectively representing the number-average length and thickness of said aggregates.

7. The composition according to claim 6, the aspect ratio (A$_1$) of the aggregates being between 3 and 10.

8. The composition according to claim 1, the aspect ratio (A$_2$) of the primary particles being between 2 and 10.

9. The composition according to claim 1, L$_2$ being between 10 and 400 nm and T$_2$ being between 5 and 30 nm.

10. The composition according to claim 9, L$_2$ being in the range of 20 to 150 nm and T$_2$ being in the range of 10 to 25 nm.

11. A process for obtaining a diene rubber composition having improved vulcanization kinetics, into which at least one diene elastomer, at least one reinforcing filler and a coupling agent are incorporated, wherein said filler comprises synthetic magnesium hydroxide Mg(OH)$_2$ covered with silica, wherein the synthetic magnesium hydroxide Mg(OH)$_2$ has a specific surface area, measured by a BET method, between 60 and 180 m$^2$/g, wherein the synthetic magnesium hydroxide Mg(OH)$_2$ is composed of aggregates agglomerated together, the aggregates include magnesium hydroxide Mg(OH)$_2$ particles which are anisometric and in the form of wafers, the magnesium hydroxide Mg(OH)$_2$ particles have an aspect ratio (A$_2$=L$_2$/T$_2$) of greater than 1.5, L$_2$ and T$_2$ respectively representing the number-average length and thickness of the particles, and wherein the entire mixture is kneaded thermomechanically, in one or more steps, until a maximum temperature between 110° C. and 190° C. is attained.

12. A finished article or semi-finished product made of the rubber composition according to claim 1.

13. A rubber article comprising the composition according to claim 1.

14. A tire comprising the rubber composition according to claim 1.

15. A tire tread comprising the rubber composition according to claim 1.

16. Synthetic magnesium hydroxide Mg(OH)$_2$ covered with silica, wherein the synthetic magnesium hydroxide Mg(OH)$_2$ has a specific surface area, measured by a BET method, between 60 and 180 m$^2$/g, and wherein the synthetic magnesium hydroxide Mg(OH)$_2$ is composed of particles which are anisometric and in the form of wafers, and the magnesium hydroxide Mg(OH)$_2$ particles have an aspect ratio ($A_2=L_2/T_2$) of greater than 1.5, $L_2$ and $T_2$ respectively representing the number-average length and thickness of the particles.

17. The synthetic magnesium hydroxide $Mg(OH)_2$ according to claim 16, the amount by weight of silica at the surface of the magnesium hydroxide wafers representing between 5% and 50% of the total weight of the wafers.

18. The synthetic magnesium hydroxide $Mg(OH)_2$ according to claim 17, the amount by weight of silica at the surface of the magnesium hydroxide wafers representing between 10% and 40% of the total weight of the wafers.

19. The synthetic magnesium hydroxide $Mg(OH)_2$ according to claim 16, the particles forming aggregates in the form of wafers which have an aspect ratio ($A_1=L_1/T_1$) greater than 2.0, $L_1$ and $T_1$ respectively representing the number-average length and thickness of said aggregates.

20. The synthetic magnesium hydroxide $Mg(OH)_2$ according to claim 19, the aspect ratio ($A_1$) of the aggregates being between 3 and 10.

21. The synthetic magnesium hydroxide $Mg(OH)_2$ according to claim 16, the aspect ratio ($A_2$) of the particles being between 2 and 10.

22. The synthetic magnesium hydroxide $Mg(OH)_2$ according to claim 16, $L_2$ being between 10 and 400 nm and $T_2$ being between 5 and 30 nm.

23. The synthetic magnesium hydroxide $Mg(OH)_2$ according to claim 22, $L_2$ being in a range of 20 to 150 nm and $T_2$ being in a range of 10 to 25 nm.

24. A reinforcing filler comprising the synthetic magnesium hydroxide Mg(OH)2 covered with silica, according to claim 16.

25. The composition according to claim 4, the amount by weight of silica representing between 10% and 40% of the total weight of the waters.

26. The composition according to claim 6, the aspect ratio of the aggregates being greater than 3.0.

27. The composition according to claim 1, the aspect ratio ($A_2$) of the particles being greater than 2.0.

28. The synthetic magnesium hydroxide $Mg(OH)_2$ according to claim 19, the aspect ratio ($A_1$) of the aggregates being greater than 3.0.

29. The synthetic magnesium hydroxide $Mg(OH)_2$ according to claim 16, the aspect ratio ($A_2$) of the particles being greater than 2.0.

* * * * *